United States Patent [19]

Carré et al.

[11] Patent Number: 4,621,713
[45] Date of Patent: Nov. 11, 1986

[54] ACTUATING MECHANISM FOR A DISC BRAKE

[75] Inventors: Jean J. Carré, Le Raincy; Pierre Pressaco, La Courneuve; Jean P. Sauvee, Aubervilliers, all of France

[73] Assignee: Societe Anonyme D.B.A., Paris, France

[21] Appl. No.: 701,897

[22] Filed: Feb. 15, 1985

[30] Foreign Application Priority Data

Feb. 29, 1984 [FR] France ................................ 84 03106

[51] Int. Cl.$^4$ ............................................. F16D 65/32
[52] U.S. Cl. ................................... 188/72.7; 188/343
[58] Field of Search ..................... 188/72.1, 72.4, 72.6, 188/72.7, 343, 369, 370, 217; 74/110

[56] References Cited

U.S. PATENT DOCUMENTS

| 3,752,266 | 8/1973 | Chouings | 188/170 |
| 4,267,903 | 5/1981 | Kita et al. | 188/72.7 X |
| 4,369,863 | 1/1983 | Farr et al. | 188/106 A |

FOREIGN PATENT DOCUMENTS 1625755 1/1970 Fed. Rep. of Germany .
2170453 9/1973 France .

*Primary Examiner*—Duane A. Reger
*Attorney, Agent, or Firm*—Larry J. Palguta; Ken C. Decker

[57] ABSTRACT

The invention concerns a mechanism for actuating a disc brake, incorporating a piston (5) coupled to a brake pad (1), a wedge (12) which is moveable longitudinally, under the action of a control rod (10), between surfaces (5a, 17a) forming part of the piston (5) and of a reaction component (17), respectively, and a pair of rollers (13) situated on each side of the wedge (12) and able to roll between the surfaces (12a, 12b) of the latter and the surfaces of the piston (5) and of the reaction component (17). The space in which the wedge (12) and the rollers (13) move is confined in a closed hydraulic chamber (17). The control rod (10) actuating the wedge forms a penetrating piston which determines variations of volume in this chamber (7) producing a hydraulic thrust upon the piston (5). The corresponding displacement of the latter is slightly greater than that which the wedge (12) would communicate to it mechanically through the intermediary of the roller (13), for the same displacement of the control rod (10).

9 Claims, 3 Drawing Figures

ACTUATING MECHANISM FOR A DISC BRAKE

The invention concerns a mechanism for actuating a disc brake, incorporating a piston coupled to a brake pad, a wedge having a pair of slightly convergent inclined surfaces which is moveable longitudinally, under the action of a control component, along a transverse direction relative to the direction of movement of the piston between surfaces forming part of the piston and of a reaction component, respectively, each of these surfaces being essentially parallel to that surface of the wedge which faces it, and at least one pair of rollers situated on each side of the wedge and able to roll between the surfaces of the latter and the facing surfaces of the piston and of the reaction component.

In an actuating mechanism of this type, when the wedge is moved forward by the control component between the piston and the reaction component, which is fixed, the piston is subjected, through the intermediary of the rollers rolling on the said surfaces, to a thrust which moves it away from the reaction component and which it communicates to the brake pad, the value of this thrust being a multiple of that which the aforementioned wedge receives from the control component.

High power disc brakes, intended for example to equip heavy vehicles, involve forces of considerable magnitude, which cause rapid deterioration of the rollers and of the surfaces with which they co-operate in order to transmit the forces mechanically.

The aim of the present invention is to overcome this disadvantage by means of an arrangement which is intended to relieve the components of the mechanism subjected to higher stress in order to increase the reliability and the life of the braking assembly.

For this purpose, according to the invention, the space situated between the surfaces of the piston and of the reaction component, in which the wedge and the rollers can move, is confined as a closed chamber which is filled with hydraulic fluid; the control component is a rod which, entering into this hydraulic chamber by a variable amount according to its longitudinal movements from a rest position, determines in it variations of volume which produce a hydraulic thrust on the piston, the corresponding movement of the latter being slightly greater, for example by 1 to 5%, than that which the wedge would communicate to it mechanically through the intermediary of the rollers, for the same movement of the control rod in the absence of hydraulic fluid enclosed in the chamber.

In an actuating mechanism arranged in the manner described, the control rod serves simultaneously as the the actuating component of the wedge and of the hydraulic piston, so that there are two ways of transmitting the forces from this control rod to the brake pad: the one—mechanical—employing in a conventional manner the wedge co-operating with rollers between inclined surfaces of the piston and of the reaction component; the other—hydraulic—using the pressure variations induced by the movements of the control rod into a hydraulic chamber and being developed, with a force multiplication effect, on the piston, also moveable in this chamber. However, the hydraulic path is made predominant by an appropriate choice of the geometric parameters of the various moving components involved. Consequently the piston is actuated hydraulically, while the rollers and the surfaces with which they co-operate are unloaded and are thus neither subjected to stress, nor to wear. But the wedge and the rollers are constantly in the correct position between the piston and the reaction component, so that the mechanical path remains available, ready to serve as a substitute for the hydraulic path if needed, for example in the case of hydraulic breakdown, or in the case of braking for parking (which must obligatorily be effected in a purely mechanical manner).

In order to avoid undesirable impacts between the rollers and the surfaces with which they co-operate at the moment of passing from the hydraulic path to the mechanical path, it is advisable to provide permanent contact between the rollers and the aforementioned surfaces. This result can be obtained by making the reaction component moveable in the same direction as the piston, so that in the hydraulic mode it can move, under the pressure of one or more return springs towards the piston, away from a fixed surface against which it bears in the mechanical mode, the small corresponding movements of the reaction component permanently eliminating the clearances between the rollers and the surfaces co-operating with the latter.

Advantageously, the hydraulic chamber is in communication with a chamber for supplying hydraulic fluid at constant pressure (in practice atmospheric pressure) from which it is isolated when the control rod leaves it rest position. More precisely, at least one communication passage may be arranged in a bulkhead separating the two chambers, which passage is blocked by the stem of the control rod when the latter leaves it rest position.

In order to be able to terminate operation in the hydraulic mode, when desired, so as to change to operation in the mechanical mode, a relief valve may be provided between the two chambers, which can be controlled so as to put the latter into communication irrespective of the position of the control rod. When, for safety reasons, the control rod is coupled to a strong spring which tends to move it in the direction of braking and is held in an inoperative position by a cylinder normally supplied with fluid under pressure (in practice compressed air), the discharge valve can be controlled by a small cylinder in parallel with the cylinder for holding the said spring, so as to remain closed as long as the supply to the latter cylinder is maintained, and to open when the opposite case applies. Thus if a lack of fluid under pressure occurs (as a result either of a breakdown, or of a deliberate command for emergency braking or for parking), the two aforementioned chambers are automatically put into communication by the relief valve and operation changes to the mechanical mode, in accordance with the requirements of the regulations.

The wedge is preferably mounted at the end of the control rod so that it is able to swing slightly relative to the axis of the said rod. It is also desirable that the rollers be held in a cage mounted at the end of the control rod and pushed by a return spring in the direction of convergence of the surfaces of the wedge.

Other characteristics and advantages of the invention will emerge more clearly from the description which follows, with reference to the accompanying drawings, of an example of embodiment which is not limiting.

Figure 1:
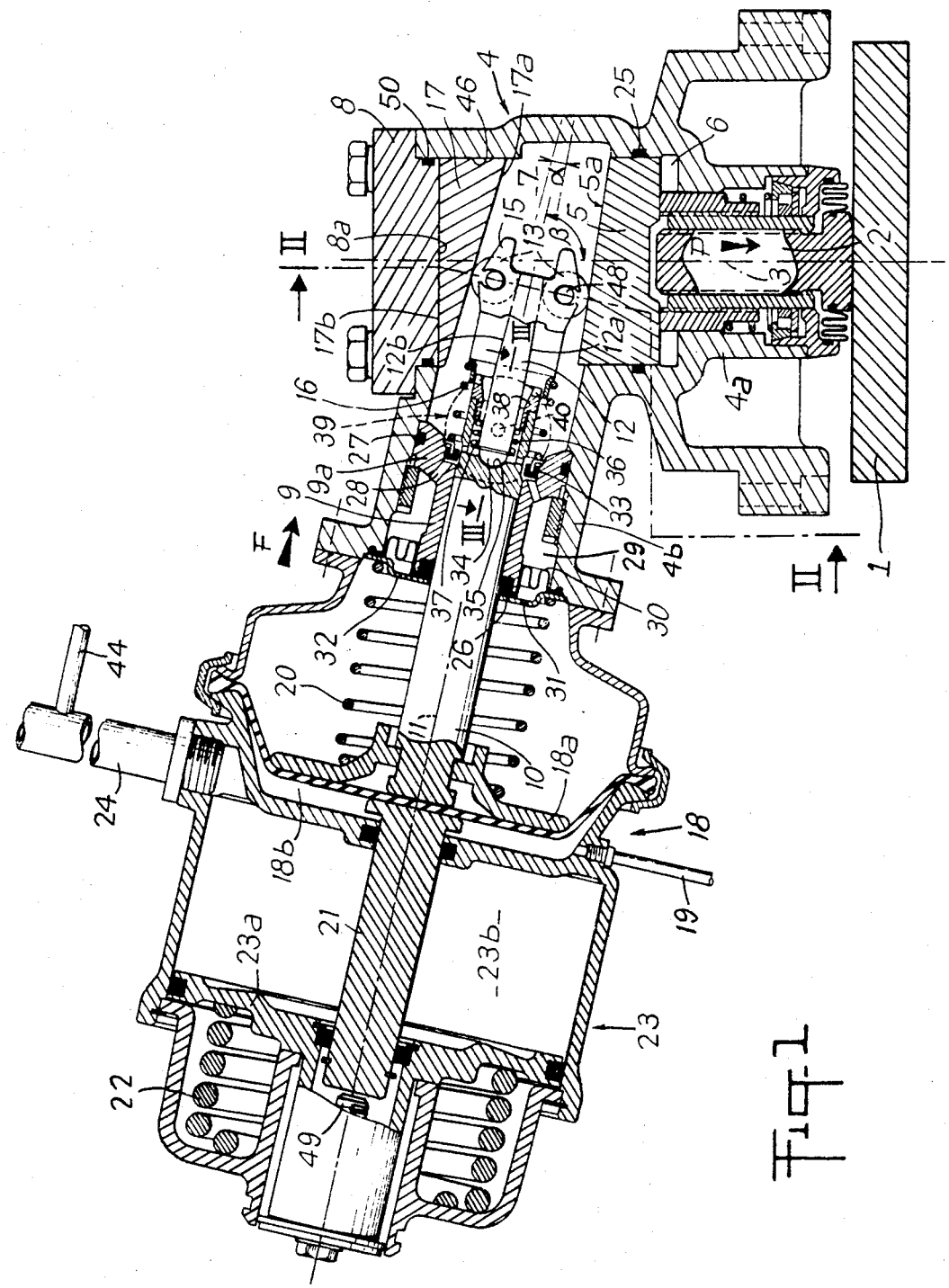
FIG. 1 shows in longitudinal partial section view a disc brake actuating mechanism according to the invention.
Figure 2:
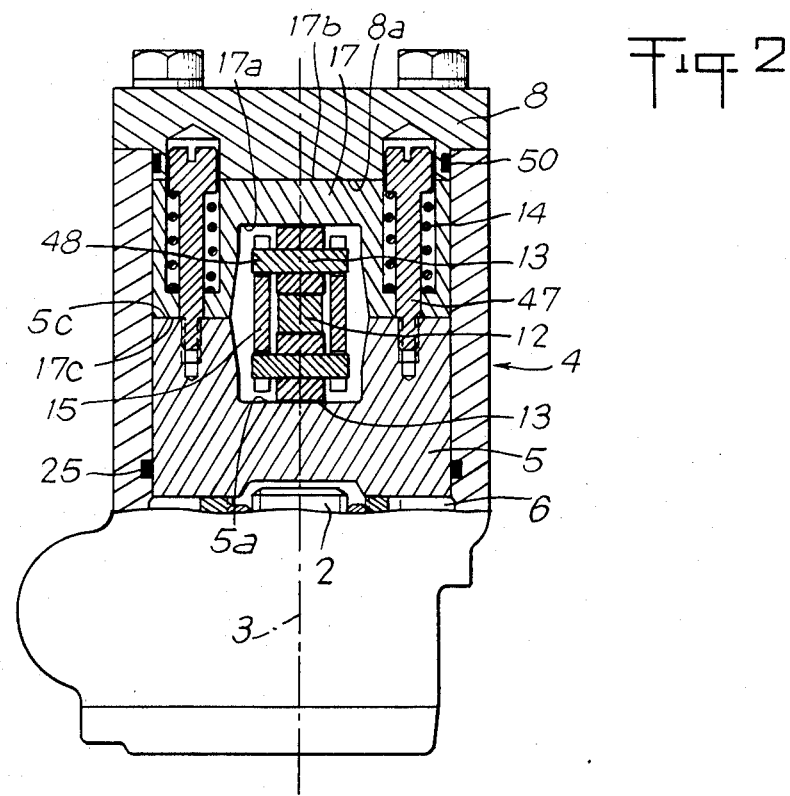
FIG. 2 shows on a larger scale a partial section view along the line II—II of the mechanism shown in FIG. 1.
Figure 3:
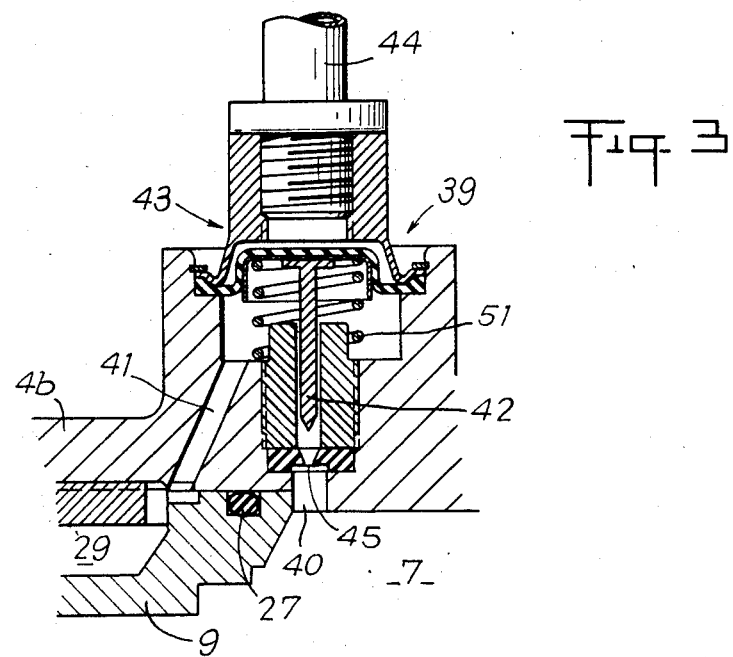
FIG. 3 shows, on an even larger scale, a partial section view along the line III—III of the mechanism shown in FIG. 1.

The disc brake actuating mechanism shown incorporates a short rod 2 controlling a brake pad 1 and able to slide along its axis 3 in a sleeve 4a forming part of a casing 4 under the thrust of a piston 5 sliding in the direction of the axis 3 inside a cylindrical guiding cavity 6 which is incorporated in the casing 4. A rod 10 enters the latter and is able to slide longitudinally along its axis 11 which makes an angle $\beta$ with the axis 3, the angle $\beta$ being slightly less than 90°.

A wedge 12 is mounted at the end of the rod 10 which is inside the casing 4, lying along the axis 11 of the said rod. This wedge incorporates a rounded head 34 which rests in a housing 35 of a mating shape which is situated at the end of the rod 10, and which is pressed into it by a compression spring 36 interposed between an abutment component 37 firmly fixed to the wedge 12 and a bush 38 screwed into the hollow end of the rod 10. The wedge 12, which the method of mounting described allows to execute small angular swings about its middle position, also has flat surfaces 12a, 12b which are slightly convergent forming an angle and serve as bearing faces for rollers 13 whose axes 48 are at right-angles to the axis 11. These rollers, mounted in a cage 15 which is elastically attached to the end of the rod 10 through the intermediary of a compression spring 16, are able to roll respectively, on the inclined surfaces 12a, 12b of the wedge 12, and secondly on surfaces which are essentially parallel to the latter, one being a surface 5a of the piston 5 at the opposite end from the rod 2, and the other a surface 17a of a reaction component 17 mounted inside the casing 4 where it is able to make small movements in translation along the axis 3 of movement of the piston 5. For this purpose, the reaction component 17 is guided in a cylindrical surface 46 inside the wall of the casing 4 in the extension of the cylindrical surface of the aforementioned cavity 6. The reaction component 17 is pushed towards the piston 5 by compression springs 14 co-operating with screws 47 which are firmly fixed to the piston. The minimum distance between the surfaces 5a and 17a of the piston 5 and of the reaction component 17 is defined by the respective abutment surfaces 5c and 17c coming into contact. In the opposite direction, the reaction component can come into abutment and bear hard with its rear surface 17b, perpendicular to the axis 3, against a mating surface 8a forming part of a cover 8 bolted onto the casing 4 so as to close the opening in the latter through which the piston 5 and the reaction component 17 are introduced.

The control rod 10 can be actuated in sliding by the piston 18a of a pneumatic cylinder 18 whose internal chamber 18b is joined by a passage 19 to a source of compressed air under the control of a brake control pedal (not shown). Conversely the rod 10 is brought back into its rest position (which is the position shown) by a return spring 20. The admission of compressed air into the chamber 18b of the cylinder 18 produces a thrust on the rod 10 which moves in the direction of the arrow F, together with the wedge 12 and the rollers 13, which causes, in the absence of arrangements which are described below, a braking thrust on the pad 1 through the intermediary of the piston 5 and the rod 2, the reaction force being carried by the reaction component 17 backed against the cover 8 of the casing 4. A travel f of the rod 10 corresponds to a travel p of the piston 5 and of the pad 1, according to a relationship which depends on the geometry of the assembly (depending essentially on the angles $\alpha$ between the surfaces of the wedge 12 and $\beta$ between the axes 11 and 3).

The thrust of a compression spring 22 can be applied to the control rod 10 through the intermediary of a rod 21, a screw 49 and a component 23a, the spring being normally held in a compressed condition, therefore not acting on the rod 10, by a pneumatic safety cylinder 23 whose piston, formed by the component 23a, retains the spring 22 as long as the internal chamber 23b of this cylinder is supplied with compressed air via a passage 24. If a breakdown of the compressed air circuit occurs, or in the case of parking of the vehicle equipped with the brake described, the chamber 23b is emptied of its air and the cylinder 23 allows the spring 22 to expand and push the rod 11 into an extreme braking position (braking in emergency or for parking).

The internal space of the casing 4, into which the rod 10 enters and in which the wedge 12 and the rollers 13 move, is arranged so as to form a closed chamber 7. The chamber is defined by the wall of the casing 4, its cover 8 (provided with a seal 50), the piston 5 (sliding so as to be sealed in the casing 4 by means of an annular seal 25) and the end of the rod 10, which slides so as to be sealed in a bush 9 mounted in a coaxial sleeve 4b of the casing 4 and provided with annular seals 26 and 27. This bush 9 incorporates a collar 9a forming an annular separating bulkhead between the chambers 7 and an annular chamber 29 for supplying hydraulic fluid, situated between the sleeve 4b and the bush 9 and closed by an annular bellows 30 whose outer surface is connected to the atmosphere by an orifice 31 formed in an annular disc 32 mounted at the end of the sleeve 4b.

Passages 28 are arranged in the collar 9a which are capable of putting into communication with one another the chambers 7 and 29. These passages are closed as soon as the rod 10, leaving its rest position, is made to move in the direction of the arrow F, the lateral surface of the stem of the rod coming into sealed contact with an annular "Boldwin" seal 33 mounted inside the bush 9, between the region where the passages 28 open into the chamber 7 and the internal volume of this chamber.

The chambers 7 and 29 are filled with hydraulic fluid. At rest, the pressure in these chambers, which then communicate through the conduits 28, is equal to atmospheric pressure (the chamber 29 being bounded by the bellows 30 which is communication with the atmosphere). When the rod 10 is made to move in the direction of the arrow F, its end, together with the components attached to the latter (the wedge 12, the rollers 13, etc), is driven into the chamber 7. There is then a rise in pressure of the hydraulic fluid enclosed in the latter, which is now isolated from the chamber 29 owing to the closure of the passages 28 by the stem of the rod 10. This rise in pressure creates a thrust P, via the piston 5, upon the pad 1, which provides the braking function.

The dimensioning of the device is designed in such a way that the variations in volume of the chamber 7 as a function of the entry f of the rod 10 and of its accessories cause, by the hydraulic path, a displacement p′ of the piston 5 which is slightly greater, by a few percent, than the displacement p corresponding to the mechanical action which the wedge 12 and the rollers 13, 14 would have on the same piston 5. Thus, during normal braking operations, the latter components are relieved of any mechanical stress, the displacement of the piston 5 being obtained in a purely hydraulic manner. However, the components are at all times in the correct position between the piston 5 and the reaction component 17 in order to take over in the case of breakdown of the hydraulic transmission of the forces and to ensure the continuation of the braking action being undertaken.

The change from hydraulic operation to mechanical operation is carried out without harm to the rollers 13, owing to the fact that they are constantly in contact with the inclined surfaces 5a and 17a of the piston 5 and of the reaction component 17, these components being drawn together under the effect of the return springs 14. Only a small joint displacement occurs of the piston 5 and of the reaction component 17 towards the cover 8, the rear surface 17b of the reaction component, which had been slightly separated from the latter during operation in the hydraulic mode, merely coming to bear against the surface 8a of the said cover. These displacements are of very small amplitude, the mechanism being dimensioned in such a way that the hydraulic travel p' only exceeds the mechanical travel p, for the same travel f of the rod 10, by approximately 1 to 5%.

In the case of braking for parking or in emergency, when the braking force is provided by the spring 22, this force must obligatorily be conveyed to the pad 1 by a purely mechanical path. This result is obtained by interrupting in this case operation by a hydraulic path, by means of a relief valve 39 mounted on the sleeve 4b of the casing 4 and capable of putting the chamber 7 into communication with the chamber 29 via passages 40 and 41. The valve 39 incorporates a needle 42 actuated by a small cylinder 43 which is joined by a passage 44 to the passage 24 for supplying compressed air to the cylinder 23. When the chamber 23b of the latter is emptied of its air, the needle 42 of the valve 39 is drawn back under the effect of a return spring 51 thus opening an orifice 45 which it normally maintains closed, and the pressure of the hydraulic fluid in the chamber 7 falls to the value of atmospheric pressure. This fluid then becomes inoperative for transmitting the braking force. to the pad 1 which then receives this force through the intermediary of the wedge 12 and of the rollers 13, by a path, therefore, which is purely mechanical. As soon as compressed air is re-admitted into the chamber 23b of the cylinder 23, the valve 39 once again isolates the chamber 7 from the chamber 29 and the hydraUlic path of actuation of the pad 1 again takes over from the mechanical path.

We claim:

1. An actuating mechanism for a disc brake, incorporating:
    a piston coupled to a brake pad,
    a wedge having a pair of slightly convergent inclined surfaces moveable longitudinally, under the effect of a control component, along a transverse direction relative to a direction of movement of the piston and between facing surfaces forming part of the piston and of a reaction component, respectively, each of the facing surfaces being essentially parallel to a respective inclined surface of the wedge, and
    at least one pair of rollers with each roller situated on a side of the wedge and able to roll between the inclined surfaces of the wedge and the facing surfaces of the piston and reaction component, characterized in that space situated between the facing surfaces of the piston and reaction component in which the wedge and rollers are able to move, is defined as a closed chamber filled with hydraulic fluid, and that the control component is a control rod which, entering into the closed chamber by a variable amount according to longitudinal movements of the rod from a rest position, determines in the chamber variations in volume which produce a hydraulic thrust on the piston with resulting movement of the piston being slightly greater than movement which the wedge would communicate mechanically to the piston by means of the rollers for a similar movement of the control rod and in the absence of hydraulic fluid enclosed in the closed chamber.

2. The mechanism according to claim 1, characterized in that relative to the similar movement of the control rod, the resulting movement of the piston by the hydraulic thrust is greater than mechanical movement of the piston by 1 to 5%.

3. The mechanism according to claim 1, characterized in that the reaction component is moveable in the direction which the piston moves and can be separated, during hydraulic operation, and under pressure toward the piston by at least one return spring, from a fixed bearing surface, so as to remain in permanent contact with the roller situated between the wedge and reaction component.

4. The mechanism according to claim 1, characterized in that the closed chamber is in communication with a chamber for supplying hydraulic fluid at constant pressure and from which the closed chamber becomes isolated when the control rod leaves the rest position.

5. The mechanism according to claim 4, characterized in that at least one communication passage is arranged in a bulkhead separating the chambers, which passage is blocked by a stem of the control rod when the control rod leaves the rest position.

6. The mechanism according to claim 4, characterized in that a relief valve is provided between the chambers and which may be controlled to put the chambers into communication irrespective of position of the control rod.

7. The mechanism according to claim 6, characterized in that the control rod is coupled to a strong spring which tends to move the control rod in a direction for braking and is held in an inoperative position by a first cylinder normally supplied with fluid under pressure, and that the relief valve is controlled by a small cylinder supplied in parallel with the first cylinder for holding the spring so that the relief valve remains closed as long as a supply of fluid to the first cylinder is maintained and the relief valve opens when the supply of fluid to the first cylinder is not maintained.

8. The mechanism according to claim 7, characterized in that the wedge is mounted at an end of the control rod and is able to swing slightly relative to an axis of the control rod.

9. The mechanism according to claim 8, characterized in that the rollers are held in a cage mounted at the end of the control rod and are pushed by a return spring in a direction of convergence of the inclined surfaces of the wedge.

* * * * *